United States Patent
Barthelemy et al.

[19]

[11] Patent Number: 5,856,679
[45] Date of Patent: Jan. 5, 1999

[54] PREMIXES FOR THE PREPARATION OF POLYURETHANE FOAMS

[75] Inventors: Pierre Barthelemy, Pietrebais; Annie Leroy, Libramont, both of Belgium

[73] Assignee: Solvay S.A., Brussels, Belgium

[21] Appl. No.: 717,880

[22] Filed: Sep. 23, 1996

[30] Foreign Application Priority Data

Sep. 26, 1995 [BE] Belgium ............................. 09500795

[51] Int. Cl.$^6$ ............................. C08G 18/34; C08K 3/00
[52] U.S. Cl. ............................. 252/182.24; 252/182.25; 252/182.26; 521/128; 521/131
[58] Field of Search ....................... 521/131; 252/182.24, 252/182.25, 182.26

[56] References Cited

U.S. PATENT DOCUMENTS

| | | |
|---|---|---|
| 3,884,917 | 5/1975 | Ibbotson . |
| 4,986,930 | 1/1991 | Lund et al. . |
| 5,137,929 | 8/1992 | Demmin et al. . |
| 5,366,662 | 11/1994 | Barthelemy et al. . |
| 5,426,127 | 6/1995 | Doerge . |
| 5,461,084 | 10/1995 | Doerge ................................ 521/131 |
| 5,464,562 | 11/1995 | Patterson .............................. 521/172 |
| 5,496,866 | 3/1996 | Sommerfeld et al. . |
| 5,672,294 | 9/1997 | Lund .................................... 521/131 |

FOREIGN PATENT DOCUMENTS

| | | |
|---|---|---|
| 0381986 | 8/1990 | European Pat. Off. . |
| 0590709 | 4/1994 | European Pat. Off. . |

OTHER PUBLICATIONS

"The 1993 International CFC and Halon Alternatives Conference", pp. 346–355, Oct. 20–22, 1993, Washington, D.C., Murphy J.A. et al.

*Primary Examiner*—Morton Foelak
*Attorney, Agent, or Firm*—Spencer & Frank

[57] ABSTRACT

Premixes intended for the preparation of polyurethane or modified polyurethane foams comprising at least one polyol and 1,1,1,3,3-pentafluorobutane as blowing agent. These premixes have proved to be particularly stable.

14 Claims, No Drawings

PREMIXES FOR THE PREPARATION OF POLYURETHANE FOAMS

FIELD OF THE INVENTION

The present invention relates to premixes intended for the preparation of polyurethane foams, containing a hydrofluorinated blowing agent, which do not require the presence of stabilizers.

TECHNOLOGY REVIEW

It is well known that polyurethane foams can be prepared by reacting an isocyanate with an appropriate amount of a polyol or of a mixture of polyols in the presence of a volatile liquid hydrofluoroalkane, which hydrofluoroalkane is evaporated by the heat released by the reaction between the isocyanate and the polyol.

It is common practice, in the field of polyurethane foams, to prepare premixes of certain components which are subsequently used to prepare the foam. Generally, the appropriate amounts of polyol, blowing agent, catalyst and other optional additives are mixed to form a premix. This premix and the appropriate amount of isocyanate are generally provided in two separate tanks, the final user then only having to mix the contents of the two tanks to manufacture the foam. Moreover, in large-scale foam production units, the polyol and the blowing agent are sometimes stored as a mixture. This liquid mixture has a lower viscosity than that of the pure polyol and is consequently easier to pump and to meter to the foam-manufacturing area. However, it is well known that halogenated blowing agents are generally susceptible to being partially degraded on contact with certain polyols, which in principle requires the use of stabilizers.

U.S. Pat. No. 4,986,930 indicates that 1,1-dichloro-1-fluoroethane (HCFC-141b) can be used as blowing agent and stored in contact with polyols without the presence of stabilizers being necessary. However, it was found that, despite everything, 1,1-dichloro-1-fluoroethane can, in certain cases, significantly degrade, in particular to 1-chloro-1-fluoroethane, vinylidene chloride and vinylidene chlorofluoride. Hydracids can also be generated by this degradation.

In addition, it is currently considered that 1,1-dichloro-1-fluoroethane should, in order to satisfy environmental protection regulations, eventually be replaced by a blowing agent which is entirely free from chlorine, in this way exhibiting a zero ozone destruction potential. Application EP-A-381,986 in particular has provided for the use, for this purpose, of certain $C_3$–$C_5$ hydrofluoroalkanes. Knopeck G. M., Parker, R. C., Richard R. G. and Shankland I. R. (35th Annual Polyurethane Technical/Marketing Conference, Oct. 9–12, 1994, p. 115–122) and Murphy J. A., Bolmer M., Elsheikh M., Roux J. D., Meynard C. and Volkert O. (CFC and Halon Alternatives Conference, Washington D.C., 1993, p. 346–355) have more particularly studied the use of 1,1,1,3,3-pentafluoropropane (EFC-245fa) or of 1,1,1,3,3-pentafluorobutane (HFC-365mfc).

SUMMARY OF THE INVENTION

One aim of the present invention is to identify a hydrofluoroalkane which can be used as blowing agent for the preparation of polyurethane foams, which is stable in the presence of polyols and/or of catalysts conventionally used during this preparation and which satisfies the requirements of respecting the environment.

Another object of the present invention is to provide premixes intended for the manufacture of polyurethane foams which contain a blowing agent of improved stability with respect to the degradation induced by the other constituents of the premixes.

Another object of the present invention is to provide a process for the preparation of polyurethane foams which makes it possible to store the polyol and the blowing agent, as a mixture, without specific precautions.

DETAILED DESCRIPTION OF THE INVENTION

The invention consequently relates to premixes intended for the preparation of polyurethane or modified polyurethane foams comprising a) at least one polyol, b) 1,1,1,3,3-pentafluorobutane as blowing agent and c) one catalyst comprising at least one compound which catalyses the polyol/isocyanate reaction and, optionally, one compound, other than an alkali metal carboxylate or a hydroxyalkylammonium carboxylate, which catalyses the trimerization of isocyanates.

Polyurethane is understood to mean the polymers resulting essentially from the reaction of polyols and of isocyanates. These polymers are typically obtained from formulations exhibiting an isocyanate number from 100 to 130.

Modified polyurethane is understood to mean the polymers resulting from the reaction of polyols and of isocyanates which contain, in addition to urethane functional groups, other types of functional groups, in particular triisocyanuric rings formed by trimerization of isocyanates. These modified polyurethanes are normally known as polyisocyanurates. These polymers are typically obtained from formulations exhibiting an isocyanate number from 130 to 450.

For the purposes of the present invention, premix is understood to mean any composition comprising at least one polyol, at least one blowing agent and at least one catalyst.

For the purposes of the present invention, polyol is understood to mean any compound containing at least two functional groups which react with isocyanates. These functional groups contain at least one active hydrogen atom, such as defined by the Zerewittinoff reaction. The active hydrogen atom is generally a hydrogen atom bonded to an oxygen, nitrogen or sulphur atom. Any polyol conventionally used to prepare polyurethane foams can be used in the premixes according to the invention. Mention may in particular be made of polyether polyols and polyester polyols.

The catalyst of the premixes according to the invention comprises a compound with catalyses the formation of the —NH—CO—O— urethane bond by reaction between a polyol and an isocyanate or which activates the reaction between an isocyanate and water, such as tertiary amines and organic tin, iron, mercury or lead compounds. Mention may in particular by made, as tertiary amines, of triethylamine, N,N-dimethylcyclohexylamine (DMCHA), N-methylmorpholine (NMM), N-ethylmorpholine, dimethylethanolamine, diaza[2.2.2]bicyclooctane (triethylenediamine) and substituted benzylamines, such as N,N-dimethylbenzylamine (DB). Mention may in particular be made, as organic tin or lead compounds, of dibutyltin dilaurate, stannous octanoate and lead octanoate.

The catalyst of the premixes according to the invention can, in particular when the latter are intended for the manufacture of modified polyurethane (polyisocyanurate) foams, comprise a compound which catalyses the trimerization of isocyanates to triisocyanurates, other than an alkali metal carboxylate or a hydroxyalkylammonium carboxylate.

It has in fact been observed that the latter, for example potassium acetate, cause significant degradation of 1,1,1,3,3-pentafluorobutane in the premixes. Compounds which catalyse the trimerization of isocyanates which can be used in the premixes according to the invention are in particular triazines. The presence of alkali metal carboxylates and/or of hydroxyalkylammonium carboxylates in the catalyst of the premixes according to the invention is nevertheless possible, in an amount not exceeding 50% of the total weight of the compounds which catalyse the trimerization of isocyanates.

In a preferred embodiment of the premixes according to the invention, the catalyst is free from compounds which substantially catalyse the trimerization of isocyanates. These preferred premixes comprise at least one polyol, 1,1,1,3,3-pentafluorobutane and, as catalyst, only one or a number of compounds which promote the polyol/isocyanate reaction.

In addition to the polyol, 1,1,1,3,3-pentafluorobutane and the catalyst, the premixes according to the invention can additionally contain various additives commonly used to prepare polyurethane or modified polyurethane foams, such as, in particular, water, surface-active agents, antioxidizing agents, flame-retardant agents and/or pigments. The more particularly preferred premixes according to the invention are essentially composed of at least one polyol, 1,1,1,3,3-pentafluorobutane, at least one catalyst which promotes the polyol/isocyanate reaction and at least one of the usual additives mentioned above.

The proportions of polyol, catalyst, 1,1,1,3,3-pentafluorobutane and optional additives in the premixes according to the invention vary, in particular according to the application, the type of foam prepared, the nature of the polyol and the nature of the catalyst. They can easily be determined in each specific case. In practice, the amount of catalyst used generally varies from approximately 0.05 to 10 parts by weight per 100 parts by weight of polyol. In general, the amount of 1,1,1,3,3-pentafluorobutane is from 1 to 80 parts by weight per 100 parts by weight of polyol. It is preferably from 10 to 60 parts by weight per 100 parts by weight of polyol. The amounts of water, surface-active agents, plasticizing agents and/or flame-retardant agents are those conventionally used to prepare polyurethane or modified polyurethane foams.

The premixes according to the invention are intended for the manufacture of polyurethane foams or of modified polyurethane (polyisocyanurate) foams. In particular, excellent results have been obtained with premixes according to the invention suited to the manufacture of rigid polyurethane foams. These premixes have proved to be particularly stable, giving rise to virtually no degradation of the 1,1,1,3,3-pentafluorobutane, even under very severe storage conditions.

The invention also relates to a process for the manufacture of polyurethane or modified polyurethane foams, in which at least one isocyanate is reacted with a premix in accordance with the invention. Any isocyanate conventionally used to manufacture such foams can be used in the process according to the invention. Mention may be made, by way of example, of aliphatic isocyanates, such as hexamethylene diisocyanate, and aromatic isocyanates, such as tolylene diisocyanate or diphenylmethane diisocyanate.

The invention also relates to a process for the manufacture of polyurethane or modified polyurethane foams, in which at least one isocyanate is reacted with at least one polyol in the presence of 1,1,1,3,3-pentafluorobutane, of at least one catalyst and of other usual additives, which is characterized in that the polyol and the 1,1,1,3,3-pentafluorobutane are used as a mixture which is not stabilized with respect to the potential degradation of the 1,1,1,3,3-pentafluorobutane caused by the polyol.

It has in fact been observed that 1,1,1,3,3-pentafluorobutane exhibits remarkable stability in the presence of polyols, which makes it possible to store them as a mixture without any specific precaution.

EXAMPLES

The examples below illustrate the invention without implied limitation.

Examples 1 to 3

Three premixes for the preparation of polyurethane foams were prepared in the following proportions by weight:

50 parts of aminated polyol of aromatic polyether type Arcol® 3770 from Arco 50 parts of aminated polyether polyol Voranol® RA 640 from Dow 1 part of water 2 parts of silicone surface-active agent Tegostab® B1048 from Goldschmidt 2 parts of N-methylmorpholine 1.5 parts of N,N-dimethylcyclohexylamine.

The premix of Example 1, in accordance with the invention, contained 28 parts by weight of 1,1,1,3,3-pentafluorobutane (HFC-365mfc).

The premixes of Examples 2 and 3, given by way of comparison, contained 24 parts of 1,1-dichloro-1-fluoroethane (HCFC-141b) and 28 parts of 1,1,1,3,3-pentafluoropropane (HFC-245fa) respectively.

These premixes were stored at a constant temperature of 70° C. Samples were removed after different storage times and analysed by gas phase chromatography, in order to measure the amounts of unsaturated products formed by dehydrohalogenation of the blowing agent.

The results are presented in Table I below. Comparison of Example 1 according to the invention with Examples 2(C) and 3(C) shows that the degradation undergone by the 1,1,1,3,3-pentafluorobutane is negligible with respect to that undergone by the 1,1-dichloro-1-fluoroethane or the 1,1,1,3,3-pentafluoropropane under identical conditions.

TABLE I

|  | Example 1 | Example 2 (C) | Example 3 (C) |
| --- | --- | --- | --- |
| Blowing agent Molar % of dehydrohalogenated blowing agent | HFC-365mfc | HCFC-141b | HFC-245fa |
| after 14 days | 0.02% | 0.25% | 0.33% |
| after 2 months | 0.08% | 0.78% | 0.33% |

Examples 4–9

Premixes suited to the preparation of polyurethane foams were prepared in the proportions by weight shown in Table II. The premixes of Examples 4 and 7 contained 1,1,1,3,3-pentafluorobutane, in accordance with the invention. The premixes of Examples 5(C) and 9 (C), provided by way of comparison, contained solely 1,1-dichloro-1-fluoroethane as blowing agent. The premixes of Examples 6(C) and 8(C), provided by way of comparison, contained solely 1,1,1,3,3-pentafluoropropane as blowing agent. These different premixes were stored at a constant temperature of 70° C.

Samples were removed after different storage times and analysed by gas phase chromatography, in order to measure the amounts of unsaturated products formed by dehydrohalogenation of the blowing agent. The results are presented in Table II. Comparison of Examples 4 and 7, in accordance with the invention, with Examples 5(C) and 6(C) and with Examples 8(C) and 9(C) respectively shows that the degradation undergone by the 1,1,1,3,3-pentafluorobutane is negligible with respect to that undergone by the 1,1-dichloro-1-fluoroethane or by the 1,1,1,3,3-pentafluoropropane.

TABLE II

| | Ex. 4 | Ex. 5 (C) | Ex. 6 (C) | Ex. 7 | Ex. 8 (C) | Ex. 9 (C) |
|---|---|---|---|---|---|---|
| Composition (parts by weight) | | | | | | |
| Tercarol ® RF 55[(1)] | 100 | 100 | 100 | — | — | — |
| Tercarol ® RF 33[(2)] | — | — | — | 50 | 50 | 50 |
| Terate ® 203[(3)] | — | — | — | 50 | 50 | 50 |
| Water | 1 | 1 | 1 | 1 | 1 | 1 |
| Tegostab ® B 1048[(4)] | 2 | 2 | 2 | — | — | 2 |
| Tegostab ® B 8404[(4)] | — | — | — | 2 | 2 | — |
| N-methylmorpholine | 2 | 2 | 2 | — | — | 2 |
| N,N-dimethylcyclo-hexylamine | 3 | 3 | 3 | — | — | 1.2 |
| N,N-dimethyl-benzylamine | — | — | — | 4.5 | 4.5 | — |
| HFC-365mfc | 28 | — | — | 28 | — | — |
| HCFC-141b | — | 24 | — | — | — | 24 |
| HFC-245fa | — | — | 28 | — | 28 | — |
| Molar % of dehydrohalogenated blowing agent | | | | | | |
| after 14 days | 0.02 | 0.34 | 0.11 | 0.02 | 0.09 | 0.28 |
| after 1 month | 0.03 | 0.56 | 0.12 | 0.02 | 0.08 | 0.33 |
| after 2 months | 0.03 | 1.17 | 0.13 | 0.03 | 0.08 | n.m. |

[(1)]Polyether polyol on a sorbitol base, sold by Enichem
[(2)]Polyether polyol on a sucrose base, sold by Enichem
[(3)]Aromatic polyester polyol, sold by Cape Industries
[(4)]Silicones, sold by Goldschmidt
n.m.: Not measured Examples 10–14

Premixes suited to the preparation of modified polyurethane foams were prepared in the proportions by weight shown in Table III. The premix of Example 10 is in accordance with the invention. The premixes of Examples 11(C), 12(C) and 13(C), provided by way of comparison, contained a catalyst of alkali metal carboxylate type or of quaternary hydroxyalkylammonium carboxylate type. The premix of Example 14(C), which contained solely 1,1-dichloro-1-fluoroethane as blowing agent, is also provided by way of comparison. These different premixes were stored at a constant temperature of 70° C. Samples were removed after different storage times and analysed by gas phase chromatography, in order to measure the amounts of unsaturated products formed by dehydrohalogenation of the blowing agent. The results are presented in Table III. Comparison of Example 10 in accordance with the invention with Examples 11(C) to 13(C) illustrates the harmful effect of alkali metal carboxylates or of quaternary hydroxyalkylammonium carboxylates on the stability of premixes containing 1,1,1,3,3-pentafluorobutane whereas, with a triazine-type trimerization catalyst, the degradation undergone by 1,1,1,3,3-pentafluorobutane is much lower and acceptable. Comparison of Examples 10 according to the invention and 14(C) demonstrates that the degradation of the 1,1,1,3,3-pentafluorobutane is much lower than that of the 1,1-dichloro-1-fluoroethane in the presence of a triazine.

TABLE III

| | Ex. 10 | Ex. 11 (C) | Ex. 12 (C) | Ex. 13 (C) | Ex. 14 (C) |
|---|---|---|---|---|---|
| Composition (parts by weight) | | | | | |
| Tercarol ® RF 33[(1)] | 100 | 100 | 100 | 100 | 100 |
| Water | 1 | 1 | 1 | 1 | 1 |
| Tegostab ® B 8404[(2)] | 1 | 1 | 1 | 1 | 1 |
| N,N-dimethylcyclo-hexylamine | 3 | 3 | 3 | 3 | 3 |
| Polycat ® 41[(3)] | 7 | — | — | — | 7 |
| Kacekat ® KCA[(4)] | — | 7 | — | — | — |
| Dabco ® TMR[(5)] | — | — | 7 | — | — |
| Dabco ® TMR2[(6)] | — | — | — | 7 | — |
| HFC-365mfc | 20 | 20 | 20 | 20 | — |
| HCFC-141b | — | — | — | — | 40 |
| Molar % of dehydrohalogenated blowing ag. | | | | | |
| after 14 days | 0.25 | 0.63 | 1.07 | 0.82 | 0.47 |
| after 1 month | 0.37 | n.m. | 1.64 | 1.20 | 1.22 |
| after 2 months | n.m. | 1.42 | 2.57 | 1.95 | 2.63 |
| after 3 months | 0.62 | n.m. | 2.99 | 2.53 | n.m. |

[(1)]Polyether polyol on a sucrose base, sold by Enichem
[(2)]Silicone, sold by Goldschmidt
[(3)]Hexahydro-1,3,5-tris[3-(N,N-dimethylamino)propyl]-1,3,5-triazine, sold by Air Products and Chemicals
[(4)]Potassium acetate, sold by Solvay Fluor und Derivate GmbH
[(5)]N-2-Hydroxypropyltrimethylammonium 2-ethylhexanoate, sold by Air Products and Chemicals
[(6)]N-2-Hydroxypropyltrimethylammonium formate, sold by Air Products and Chemicals.

Examples 15–16

In Example 15, a polyisocyanurate foam was prepared by hand mixing, starting with a polymeric diphenylmethane diisocyanate Desmodur® 44V20 sold by Bayer and with a premix with the following composition:

100 parts of polyether polyol on a sorbitol base Tercarol® RF55, sold by Enichem 1 part of water 2 parts of silicone surface-active agent Tegostab® B 8404 from Goldschmidt 3 parts of N,N-dimethylcyclohexylamine 7 parts of hexahydro-1,3,5-tris[3-(N,N-dimethylamino) propyl]-1,3,5-triazine Polycat® 41, sold by Air Products and Chemicals 60 parts by weight of 1,1,1,3,3-pentafluorobutane (365mfc).

The polyol, the surface-active agent, the water and the blowing agent were successively introduced into a mixing bowl and then, after a first period of stirring, the catalysts were introduced. The isocyanate was then added, in the proportion of 404.3 parts per 100 parts of polyol, which corresponds to an isocyanate number of 300 (100 times the ratio of the number of isocyanate functional groups to the number of hydroxyl functional groups in the reaction mixture). The composition obtained was then immediately intimately mixed for 25 seconds by means of a multiblade-type stirrer rotating at 1600 revolutions per minute and was then decanted into a free-expansion mould where expansion and maturing of the foam take place.

In Example 16(C), 1,1,1,3,3-pentafluoropropane (245fa) was used instead of 1,1,1,3,3-pentafluorobutane.

For each foam, the content of products from the dehydrohalogenation of the hydrofluoroalkane within the foam was measured, by chromatographic analysis, immediately after its manufacture and after storage for one month at 50° C. The results are collated in Table IV.

TABLE IV

|  | Example 15 | Example 16 (C) |
|---|---|---|
| Blowing agent | 365 mfc | 245 fa |
| Molar % of dehydro-halogenated blowing agent | | |
| Beginning | 0.04% | 0.86% |
| 50° C.; 1 month | 0.08% | 1.16% |

Examples 17–19

In Example 17, a polyurethane foam was prepared by hand mixing, starting with a polymeric diphenylmethane diisocyanate Desmodur® 44V20, sold by Bayer, and with a premix with the following composition:

100 parts of polyether polyol on a sorbitol base Tercarol® RF55, sold by Enichem 1 part of water 2 parts of silicone surface-active agent Tegostab® B 8404 from Goldschmidt 3 parts of N,N-dimethylcyclohexylamine 2 parts of N-methylmorpholine 30 parts by weight of 1,1,1,3,3-pentafluorobutane (365mfc).

The polyol, the surface-active agent, the water and the blowing agent were successively introduced into a mixing bowl and then, after a first period of stirring, the catalysts were introduced. The isocyanate was then added, in the proportion of 148.3 parts per 100 parts of polyol, which corresponds to an isocyanate number of 110. The composition obtained was then immediately intimately mixed for 25 seconds by means of a multiblade-type stirrer rotating at 1600 revolutions per minute and was then decanted into a free-expansion mould where expansion and maturing of the foam take place.

In Examples 18(C) and 19(C), 1,1,1,3,3-pentafluoropropane (245fa) and 1,1-dichloro-1-fluoroethane (141b) were used instead of 1,1,1,3,3-pentafluorobutane.

For each foam, the content of products from the dehydrohalogenation of the hydrofluoroalkane within the foam was measured, by chromatographic analysis, immediately after its manufacture and after storage for one month at 100° C. The results are collated in Table V.

Comparison of these examples demonstrates that the degradation undergone by the HFC-365mfc is much less than that of the HFC-245fa and of the HCFC-141b in the polyurethane foam tested.

TABLE V

|  | Example 17 | Example 18 | Example 19 |
|---|---|---|---|
| Blowing agent | 365 mfc | 245 fa | 141b |
| Molar % of dehydro-halogenated blowing agent | | | |
| Beginning | 0.03% | 0.05% | 0.18% |
| 100° C.; 1 month | 0.03% | 0.14% | 1.76% |

What is claimed is:

1. A premix for the preparation of polyurethane or modified polyurethane foam, comprising:

a) at least one polyol, b) 1,1,1,3,3-pentafluorobutane as blowing agent, and c) a catalyst comprising at least one compound which catalyses a polyol/isocyanate reaction and, up to one compound, other than an alkali metal carboxylate or a hydroxyalkylammonium carboxylate, which catalyses the trimerization of isocyanates said premix not stabilized with respect to the potential degradation of the 1,1,1,3,3-pentafluorobutane caused by the polyol, and adapted to be stored without degradation of 1,1,1,3,3-pentafluorobutane.

2. The premix according to claim 1, in which the catalyst consists of at least one compound which catalyses the polyol/isocyanate reaction.

3. The premix according to claim 1 additionally containing various additives commonly used to prepare polyurethane or modified polyurethane foams.

4. The premix according to claim 1, in which the amount of 1,1,1,3,3-pentafluorobutane is from 1 to 80 parts by weight per 100 parts by weight of polyol.

5. The premix according to claim 1, suited to the manufacture of rigid polyurethane foams.

6. The premix according to claim 1, in which the catalyst is free from compounds which substantially catalyst the trimerization of isocyanates.

7. A process for the manufacture of polyurethane or modified polyurethane foam comprising reacting at least one isocyanate with a premix according to claim 1.

8. A process for the manufacture of polyurethane or modified polyurethane foam comprising reacting at least one polyol in the presence of 1,1,1,3,3,-pentafluorobutane and of at least one catalyst, wherein the polyol and the 1,1,1,3,3-pentafluorobutane are used as a mixture which is not stabilized with respect to the potential degradation of the 1,1,1,3,3-pentafluorobutane caused by the polyol.

9. Polyurethane or modified polyurethane foam prepared by a process in accordance with claim 7.

10. Polyurethane or modified polyurethane foam prepared by a process in accordance with claim 8.

11. Rigid polyurethane foam prepared by a process in accordance with claim 7.

12. Rigid polyurethane foam prepared by a process in accordance with claim 8.

13. A premix for the preparation of polyurethane or modified polyurethane foam not stabilized with respect to the potential degradation of the 1,1,1,3,3-pentafluorobutane caused by the polyol, and, consisting essentially of:

a) at least one polyol, b) 1,1,1,3,3-pentafluorobutane as blowing agent and c) a catalyst comprising at least one compound which catalyses a polyol/isocyanate reaction and, up to one compound, other than an alkali metal carboxylate or a hydroxyalkylammonium carboxylate, which catalyses the trimerization of isocyanates.

14. A premix for the preparation of polyurethane modified polyurethane foam, consisting of:

a) at least one polyol, b) 1,1,1,3,3-pentafluorobutane as blowing agent, c) a catalyst comprising at least one compound which catalyses a polyol/isocyanate reaction and, up to one compound, other than an alkali metal carboxylate or a hydroxyalkylammonium carboxylate, which catalyses the trimerization of isocyanates, and optionally d) at least one additive selected from water, surface-active agents, antioxidizing agents, flame-retardant agents and pigments.

* * * * *